(12) United States Patent  
Chen

(10) Patent No.: US 8,253,242 B2  
(45) Date of Patent: Aug. 28, 2012

(54) SENSOR ASSEMBLY

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 414 days.

(21) Appl. No.: 12/644,644

(22) Filed: Dec. 22, 2009

(65) Prior Publication Data

US 2010/0162813 A1 Jul. 1, 2010

(30) Foreign Application Priority Data

Dec. 27, 2008 (CN) .......................... 2008 1 0306576

(51) Int. Cl.
- *G01D 21/02* (2006.01)
- *H01L 27/00* (2006.01)
- *G01H 11/06* (2006.01)
- *G01P 15/09* (2006.01)
- *G01P 15/097* (2006.01)

(52) U.S. Cl. ..... 257/723; 33/354; 73/504.15; 73/504.16; 73/509; 73/514.29; 73/514.34; 74/5.22; 250/215; 257/428; 257/432; 343/720; 356/72; 367/140

(58) Field of Classification Search ............... 33/354; 73/432.1, 495, 504.03–504.04, 504.15–504.16, 73/509–511, 514.15, 514.21, 514.29, 514.34, 73/514.36; 74/5 R, 5.22; 250/215–216, 250/226; 257/428, 432, 723–724; 343/720; 348/294; 356/72; 367/140; 396/429

See application file for complete search history.

(56) References Cited

U.S. PATENT DOCUMENTS

| | | | | |
|---|---|---|---|---|
| 6,122,538 | A * | 9/2000 | Sliwa et al. | 73/510 X |
| 6,369,417 | B1 * | 4/2002 | Lee | 257/432 X |
| 7,337,650 | B1 * | 3/2008 | Preston et al. | 73/1.38 |
| 7,342,311 | B2 * | 3/2008 | Krulevitch et al. | 257/724 X |
| 8,097,890 | B2 * | 1/2012 | Qian et al. | 257/98 |
| 8,183,510 | B2 * | 5/2012 | Venezia et al. | 250/216 X |
| 2005/0194651 | A1 * | 9/2005 | Ohashi | 73/514.34 X |
| 2007/0206945 | A1 * | 9/2007 | DeLorme et al. | 396/332 |
| 2007/0230722 | A1 * | 10/2007 | Mori et al. | 381/174 |
| 2008/0231145 | A1 * | 9/2008 | Nagano et al. | 310/344 |
| 2010/0219789 | A1 * | 9/2010 | Bermak et al. | 73/514.34 X |
| 2011/0284976 | A1 * | 11/2011 | Ota | 257/416 |
| 2012/0132002 | A1 * | 5/2012 | Dube et al. | 73/504.16 |

FOREIGN PATENT DOCUMENTS

| | | | | |
|---|---|---|---|---|
| CN | 1704976 | | 12/2005 | |
| CN | 101048016 | | 10/2007 | |
| CN | 101197320 | | 6/2008 | |
| CN | 101272135 | | 9/2008 | |
| EP | 507456 | A2 * | 10/1992 | 257/432 |

(Continued)

*Primary Examiner* — Thomas P Noland  
(74) *Attorney, Agent, or Firm* — Altis Law Group, Inc.

(57) ABSTRACT

A sensor assembly includes a sound sensor, an image sensor, an acceleration sensor, and a gyroscope sensor. The sound sensor includes a substrate defining a first cavity, a diaphragm positioned on the substrate and covering the first cavity, a back plate covering the diaphragm and positioned on the substrate, and a capacitance. A first electrode layer is coated on the diaphragm and faces the first cavity. A second cavity is defined between the diaphragm and the back plate. A second electrode layer is coated on the back plate and faces the second cavity. The capacitance is electrically connected between the first and second electrode layers. The image sensor, the acceleration sensor, and the gyroscope sensor are positioned on the substrate.

20 Claims, 8 Drawing Sheets

FOREIGN PATENT DOCUMENTS

| | | | | |
|---|---|---|---|---|
| EP | 1341234 A2 | * | 9/2003 | |
| EP | 1414069 A2 | * | 4/2004 | |
| EP | 1783498 A2 | * | 5/2007 | |
| GB | 2251721 A | * | 7/1992 | .................. 257/432 |
| GB | 2251978 A | * | 7/1992 | .................. 257/432 |
| TW | 201026592 A | * | 7/2010 | |

* cited by examiner

SENSOR ASSEMBLY

BACKGROUND

1. Technical Field

The disclosure relates to sensor technologies, and particularly to a sensor assembly which has multi-detecting functions.

2. Description of Related Art

Sensors can be categorized into many different categories, such as image sensors, sound sensors, gyroscope sensors, acceleration sensors, radio frequency sensors, for example. These sensors have been widely used in electronic devices, such as digital cameras, mobile phones, global positioning devices, and notebook computers. However, a typical sensor generally has a single function, which cannot meet the multifunctional demands of current electronic devices.

Therefore, a new sensor assembly is desired to overcome the above-described shortcoming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
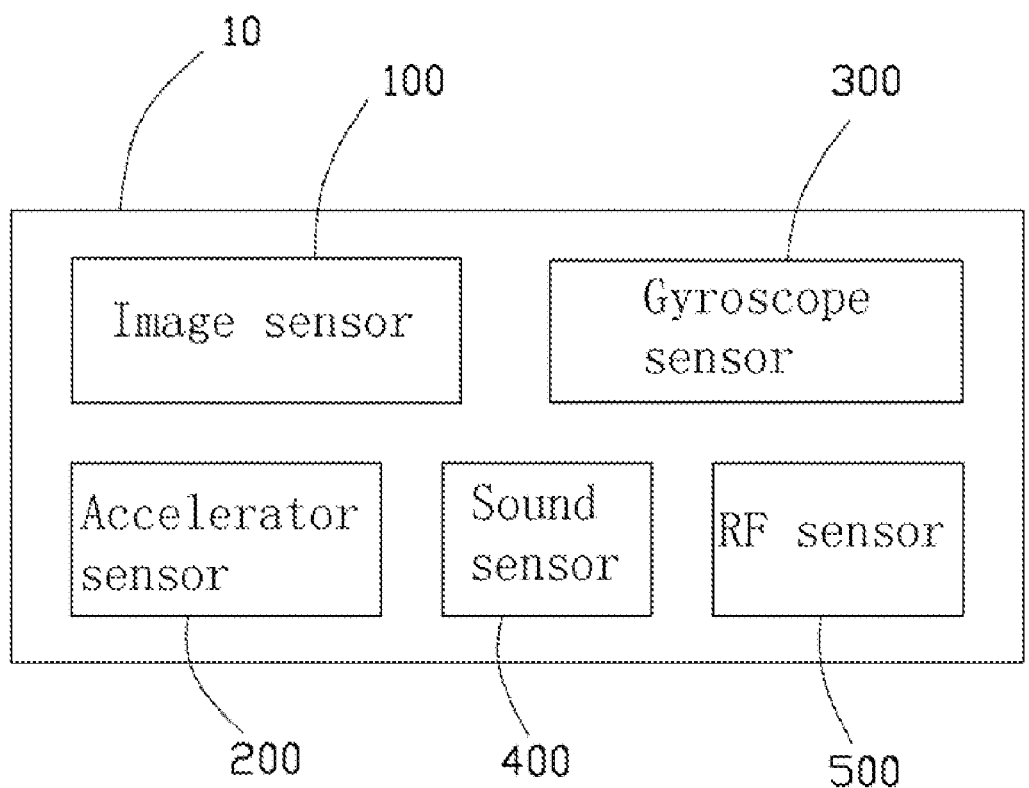
FIG. 1 is a diagram of one embodiment of a sensor assembly, the sensor assembly including an image sensor, an acceleration sensor, a gyroscope sensor, a sound sensor, and a radio frequency sensor.

Referring to FIG. 1, one embodiment of a sensor assembly 10 includes an image sensor 100, an acceleration sensor 200, a gyroscope sensor 300, a sound sensor 400, and a radio frequency (RF) sensor 500.

Figure 2:
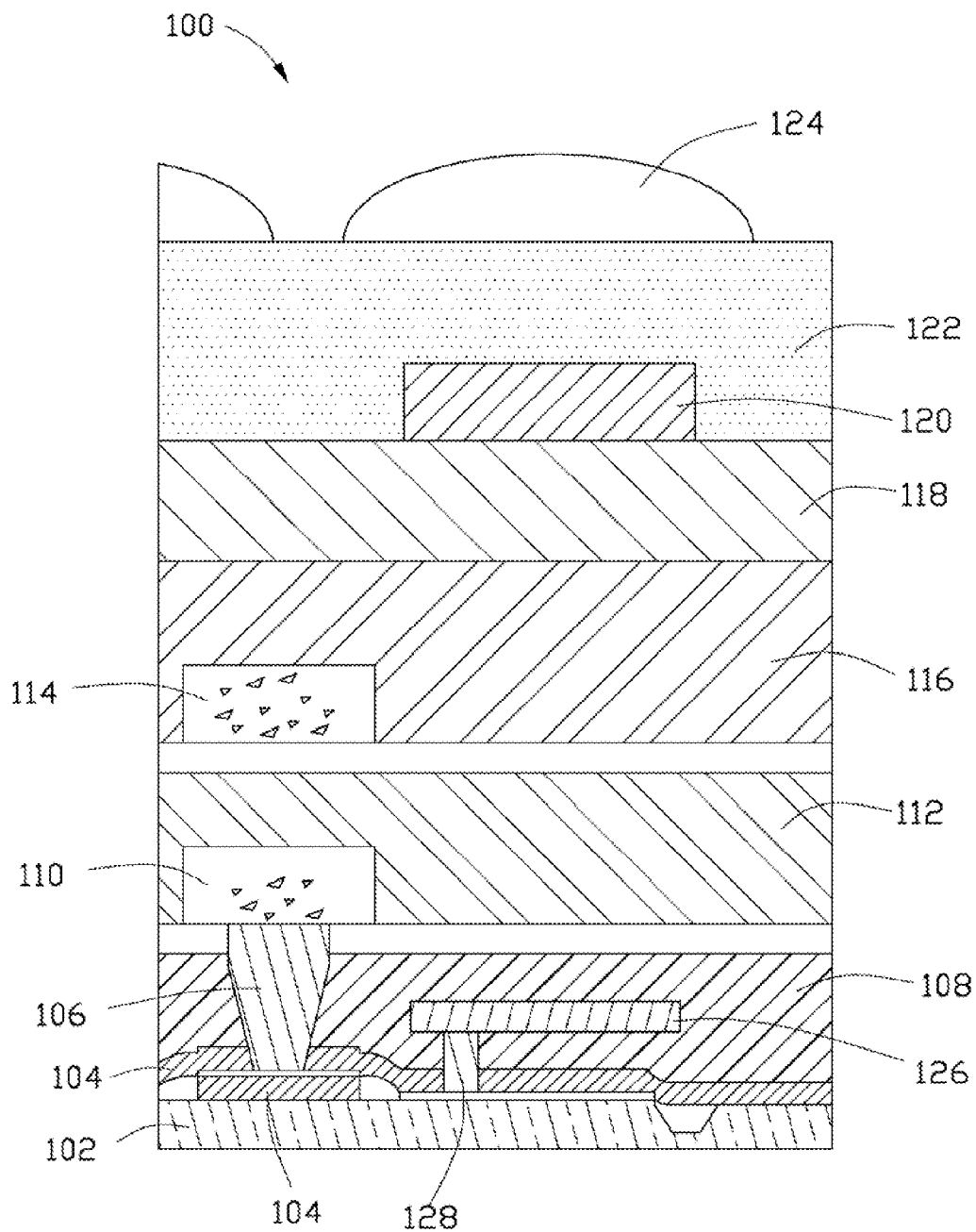
FIG. 2 is a partial, cross-sectional view of the image sensor of the sensor assembly of FIG. 1.

Referring to FIG. 2, the image sensor 100 may be a complementary metal oxide semiconductor (CMOS) image sensor. The CMOS image sensor 100 includes a photodiode layer 102, a power line layer 104, a plurality of gate electrodes 106, a first dielectric layer 108, a first metal layer 110, a second dielectric layer 112, a second metal layer 114, a third dielectric layer 116, a nitride layer 118, a plurality of color filters 120, a planarization layer 122, a plurality of micro-lenses 124, a plurality of epitaxial units 126, and a plurality of connecting units 128.

The power line layer 104 is positioned on the photodiode layer 102. Each gate electrode 106 is connected between the power line layer 104 and the first metal layer 110. The first dielectric layer 108 is positioned between the power line layer 104 and the first metal layer 110. The second dielectric layer 112 is positioned between the first and second metal layers 110, 114. The second dielectric layer 112 is configured to insulate the first metal layer 110 from the second metal layer 114. The third dielectric layer 116 is positioned between the second metal layer 114 and the nitride layer 118. The third dielectric layer 116 is configured to insulate the second metal layer 114 from the nitride layer 118. The color filters 120 are arrayed on the nitride layer 118. The planarization layer 122 is positioned on the nitride layer 118 and packages the color filters 120. The micro-lenses 124 are positioned on the planarization layer 122.

The epitaxial units 126 are positioned within the first dielectric layer 108. Each connecting unit 128 connects a corresponding epitaxial unit 126 to the power line layer 104. In one embodiment, the epitaxial unit 126 is made of N-type silicon and has a thickness of about 300-500 angstroms.

Figure 3:
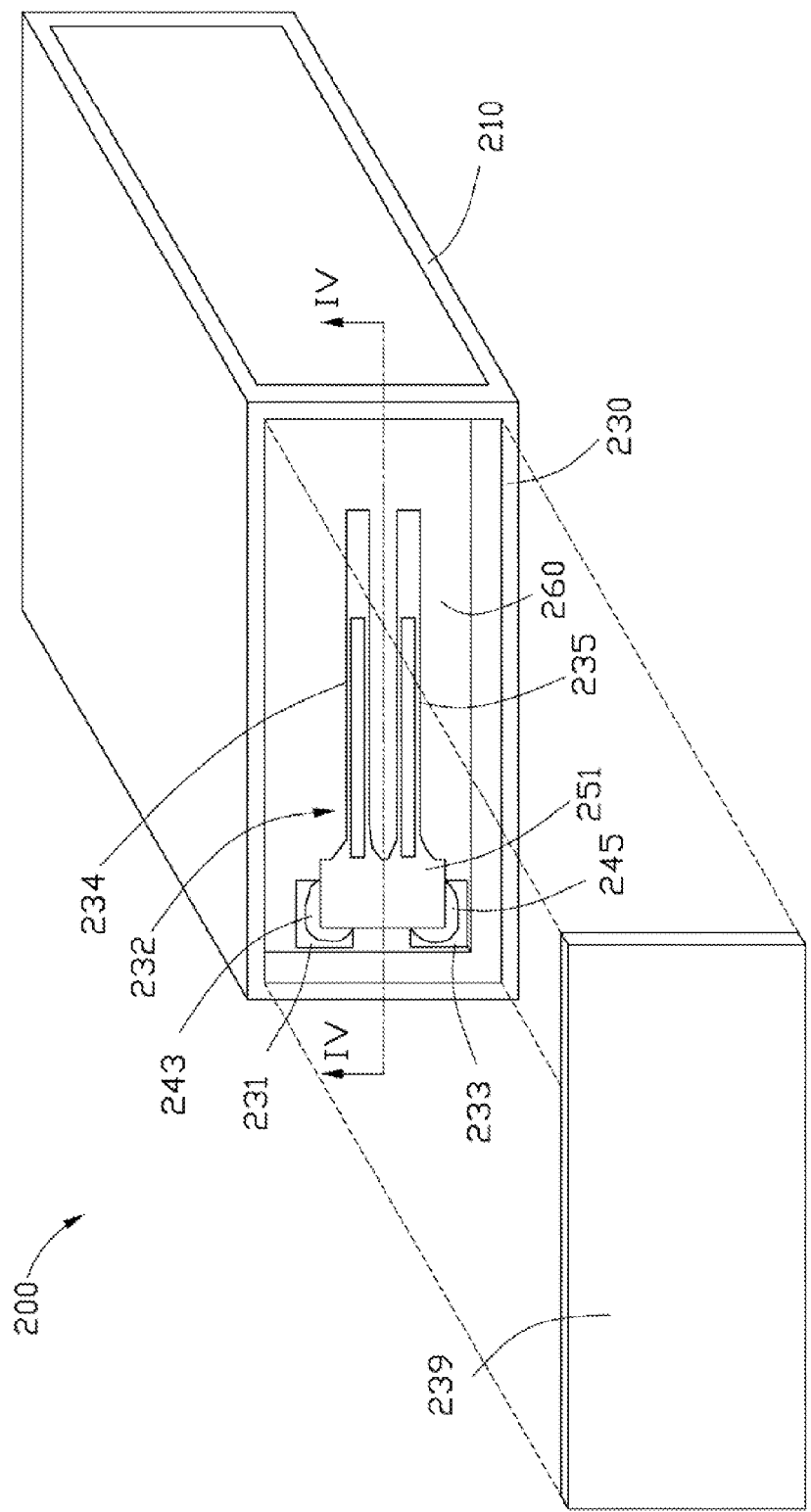
FIG. 3 is a perspective view of the acceleration sensor of the sensor assembly of FIG. 1, the acceleration sensor including a piezoelectric vibrating member.
Figure 4:
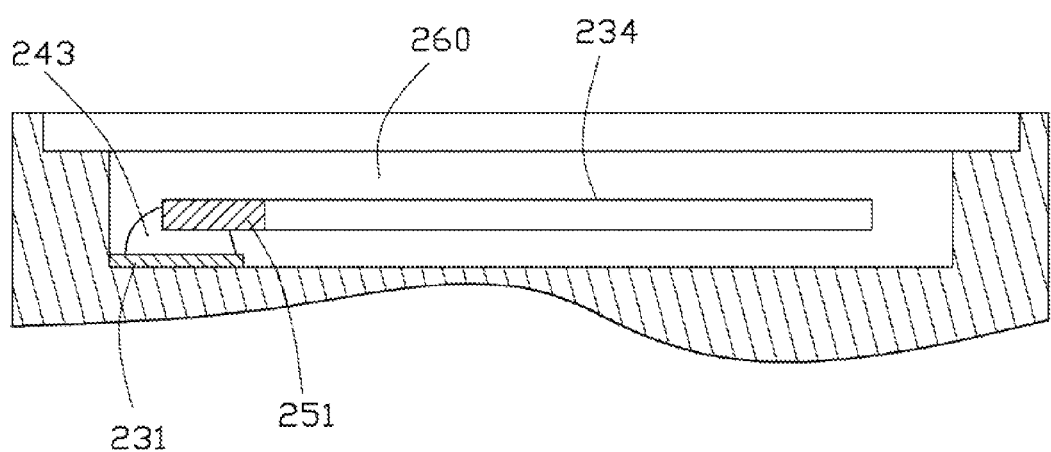
FIG. 4 is a partial, cross-sectional view of the acceleration sensor of FIG. 3, taken along line IV-IV.

Referring to FIGS. 3 and 4, the acceleration sensor 200 includes a packaging unit 210. The packaging unit 210 is substantially cubic-shaped and has a surface 230.

A recess 260 is defined in the surface 230. A positive electrode 231 and a negative electrode 233 are positioned on the bottom portion of the recess 260 and configured to be electrically connected to a power source. The positive electrode 231 is coated with a first conductive glue layer 243, and the negative electrode 233 is coated with a second conductive glue layer 245. A piezoelectric vibrating member 232 is positioned on the first and second conductive glue layers 243, 245. A cover 239 covers and seals the recess 260. In one embodiment, each of the first and second conductive glue layers 243, 245 is comprises of a resin material doped with conductive particles, such as silver particles. The cover 239 is made of a material selected from the group consisting of a ceramic material, a metal material and a glass material.

The piezoelectric vibrating member 232 is in a shape of a tuning fork and includes a base 251, a first vibrating arm 234, and a second vibrating arm 235. The base 251 is positioned on the first and second conductive glue layers 243, 245. The first and second vibrating arms 234, 235 extend from the base 251 and are substantially parallel to each other.

Figure 5:
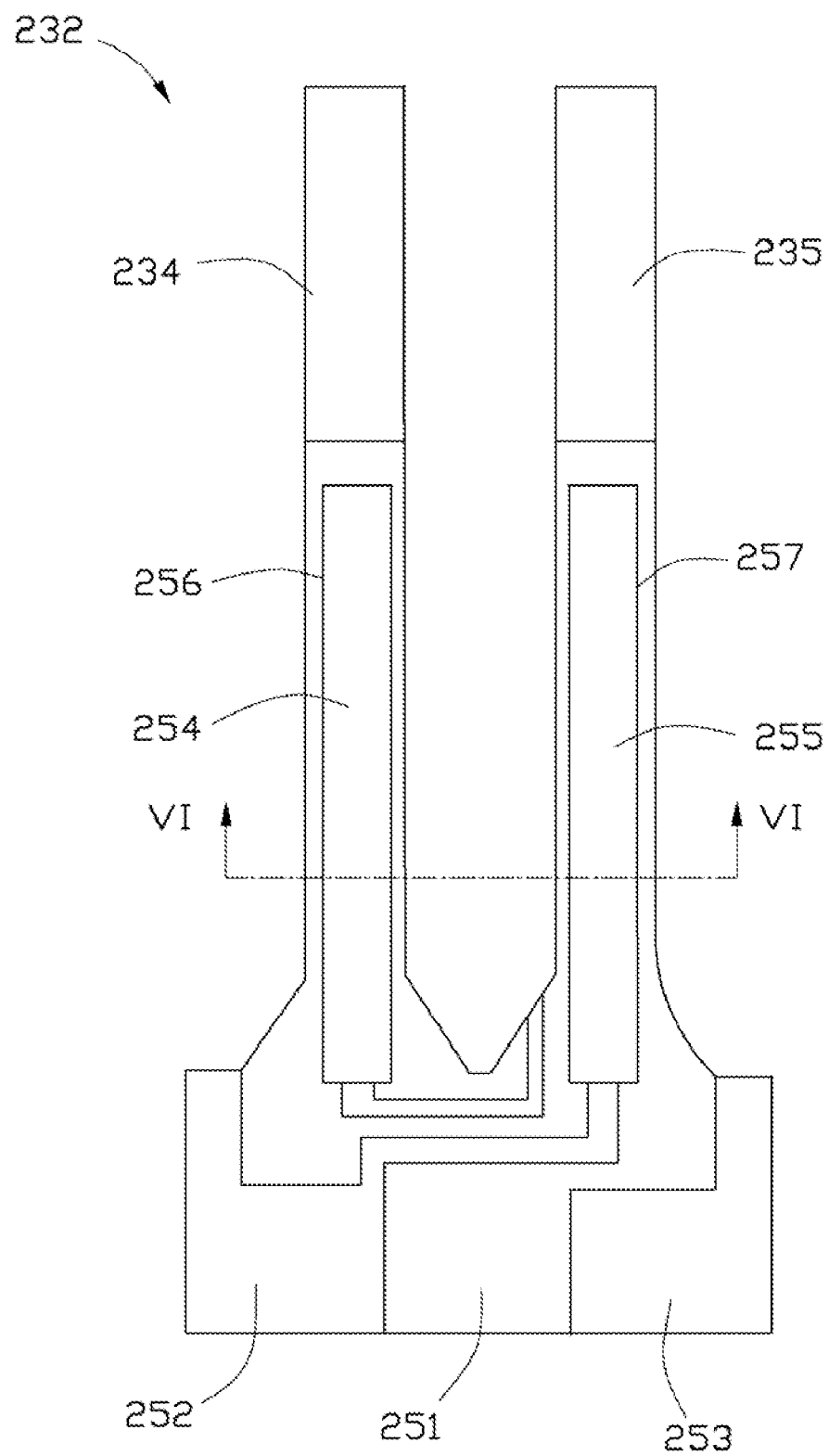
FIG. 5 is a perspective view of the piezoelectric vibrating member of the acceleration sensor of FIG. 3
Figure 6:
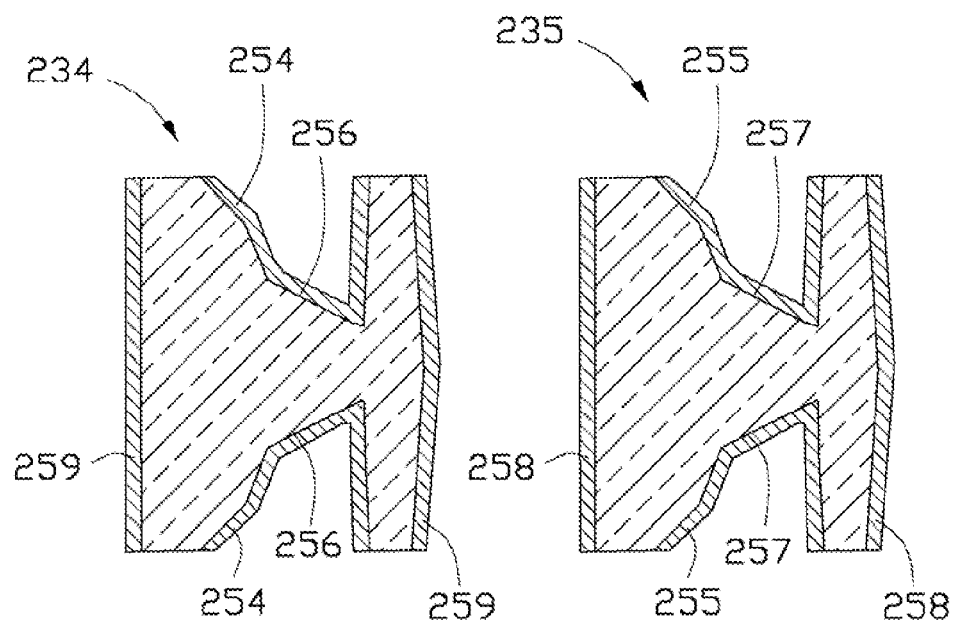
FIG. 6 is a cross-sectional view of the piezoelectric vibrating member of FIG. 5, taken along line VI-VI.

Referring to FIGS. 5 and 6, a second positive electrode 252 and a second negative electrode 253 are positioned at two opposite sides of the base 251. The first conductive glue layer 243 electrically connects the second positive electrode 252 to the first positive electrode 231, and the second conductive glue layer 245 electrically connects the second negative electrode 253 to the first negative electrode 233.

A first strip-shaped groove 256 is longitudinally defined in each of a front surface and a back surface of the first vibrating arm 234. Similarly, a second strip-shaped groove 257 is longitudinally defined in each of a front surface and a back surface of the second arm 235. A first actuating negative electrode 254 is positioned on an inner surface of each first strip-shaped groove 256, and a second actuating negative electrode 258 is positioned at two opposite sides of the second vibrating arm 235. Similarly, a first actuating positive electrode 255 is positioned on an inner surface of the second strip-shaped groove 257, and a second actuating positive electrode 259 is positioned at two opposite sides of the first vibrating arm 234. The second positive electrode 252 is electrically connected to the first and second actuating positive electrodes 255, 259, and the second negative electrode 253 is electrically connected to the first and second actuating negative electrodes 254, 258. In one embodiment, the piezoelectric vibrating member 232 has a length of about 1300 micrometers, and each of the first and second vibrating arms 234, 235 has a length of about 1040 micrometers and a width in a range from about 40 micrometers to about 55 micrometers. The second positive and negative electrodes 252, 253 and the actuating electrodes 254, 255, 258, 259 are made of tungsten, in one embodiment.

Figure 7:
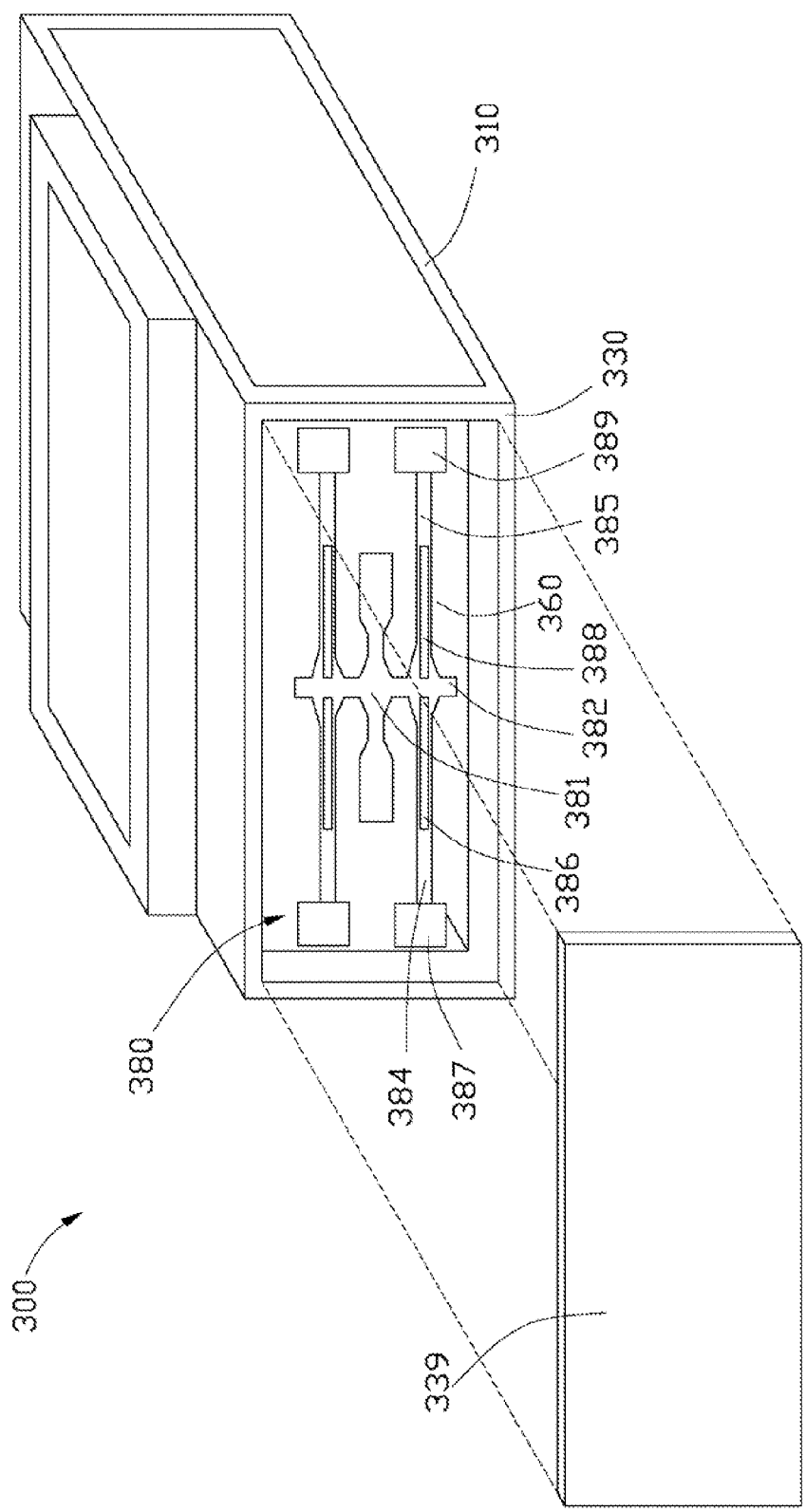
FIG. 7 is a perspective view of the gyroscope sensor of the sensor assembly of FIG. 1.

Referring to FIG. 7, the gyroscope sensor 300 includes a packaging member 310. The packaging member 310 is substantially cubic-shaped and has a plane 330.

A receiving cavity 360 is defined in the plane 330. A gyroscope member 380 is positioned on the bottom of the receiving cavity 360. A cover plate 339 covers and seals the receiving cavity 360. The gyroscope member 380 includes a main body 381, two supporting members 382, two actuating cantilever beams 384, and two detecting cantilever beams 385. The two supporting members 382 are positioned at two opposite sides of the main body 381 and extend in opposite directions from the main body 381. Each actuating cantilever beam 384 and a corresponding detecting cantilever beam 385 extend in opposite directions from the supporting member 382.

A first receiving groove 386 is longitudinally defined in each of a front surface and a back surface of the actuating cantilever beam 384 and configured to receive an actuating electrode member. Similarly, a second receiving groove 388 is longitudinally defined in each of a front surface and a back surface of the detecting cantilever beam 385 and configured to receive a detecting electrode member.

A first mass block 387 is positioned at the end of each actuating cantilever beam 384 and configured to increase the sensitivity of the actuating cantilever beam 384. A second mass block 389 is positioned at the end of each detecting cantilever beam 385 and configured to increase the sensitivity of the detecting cantilever beam 385.

Figure 8:
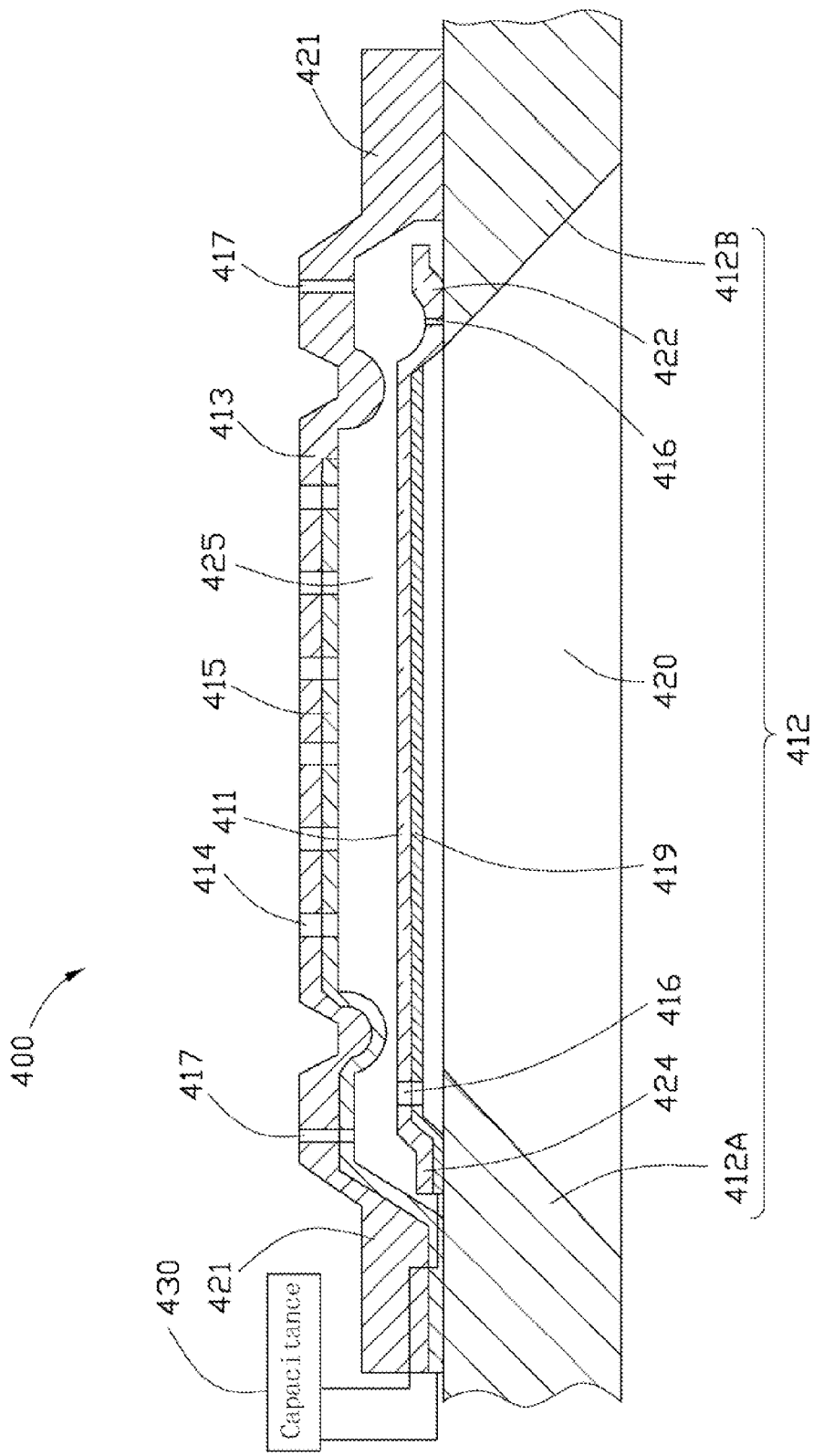
FIG. 8 is a cross-sectional view of the sound sensor of the sensor assembly of FIG. 1.

Referring to FIG. 8, the sound sensor 400 includes a substrate 412, a diaphragm 411, and a back plate 413. The substrate 412 includes a first supporting portion 412A and a second supporting portion 412B spaced apart from the first supporting portion 412A. In one embodiment, the substrate 412 is made of silicon. A first cavity 420 is defined in the substrate 412 between the first and second supporting portions 412A, 412B. The diaphragm 411 covers the first cavity 420 and has a free end 422 and a fixed end 424. The fixed end 424 is fixed on the first supporting portion 412A. The free end 422 rests on and contacts the second supporting portion 412B, and is configured to release internal stress generated by the diaphragm 411. A plurality of first vents 416 is defined in a peripheral portion of the diaphragm 411 and communicates with the first cavity 420. A first electrode layer 419 is coated on the diaphragm 411 and faces the first cavity 420.

The back plate 413 covers the diaphragm 411. The back plate 413 has a plurality of edges 421. The edges 421 are positioned on the first and second supporting portions 412A, 412B. A second cavity 425 is defined between the diaphragm 411 and the back plate 413 and communicates with the first vents 416. A second electrode layer 415 is coated on the back plate 413 and faces the second cavity 425. A capacitance 430 is electrically connected between the first and second electrode layers 419, 415. A plurality of second vents 417 is defined in the back plate 413 and adjacent to the edges 412. The second vents 417 communicate with the second cavity 425. A plurality of sound holes 414 is defined in a center portion of the back plate 413 and communicates with the second cavity 425. In use, a power source is applied to the first and second electrode layers 419, 415. When a sound wave acts on the diaphragm 411 through the sound holes 414, the diaphragm 411 vibrates in response to the sound wave. As a result, electric charge stored in the capacitance 430 changes, such that the sound wave is detected by the sound sensor 400.

The RF sensor 500 includes a BLUETOOTH module, a wireless local area network module, and a code division multiple access module.

In assembly, the photodiode layer 102, the acceleration sensor 200, the gyroscope sensor 300 and the RF sensor 500 are positioned on the substrate 412.

It is believed that the present embodiments and their advantages will be understood from the foregoing description, and it will be apparent that various changes may be made thereto without departing from the spirit and scope of the embodiments or sacrificing all of its material advantage.

What is claimed is:

1. A sensor assembly, comprising:
    a sound sensor, comprising:
        a substrate defining a first cavity;
        a diaphragm positioned on the substrate and covering the first cavity, wherein a plurality of first vents is defined in a peripheral portion of the diaphragm and communicates with the first cavity, and a first electrode layer is coated on the diaphragm and faces the first cavity;
        a back plate covering the diaphragm and positioned on the substrate, wherein a second cavity is defined between the diaphragm and the back plate and communicates with the first vents, a second electrode layer is coated on the back plate and faces the second cavity, and a plurality second vents is defined in the back plate and communicates with the second cavity; and
        a capacitance electrically connected between the first and second electrode layers;
    an image sensor positioned on the substrate;
    an acceleration sensor positioned on the substrate; and
    a gyroscope sensor positioned on the substrate.

2. The sensor assembly of claim 1, wherein the substrate comprises a first supporting portion and a second supporting portion, the first cavity is defined between the first and second supporting portions, the diaphragm has a free end and a fixed end, the fixed end is positioned on the first supporting portion, and the free end contacts the second supporting portion.

3. The sensor assembly of claim 2, wherein the back plate has a plurality of edges, and the edges are positioned on the first and second supporting portions.

4. The sensor assembly of claim 3, wherein the second vents are adjacent to the edges.

5. The sensor assembly of claim 1, wherein a plurality of sound holes are defined in a center portion of the back plate and communicates with the second cavity.

6. The sensor assembly of claim 1, further comprising a radio frequency sensor positioned on the substrate.

7. The sensor assembly of claim 6, wherein the radio frequency sensor comprises a BLUETOOTH module, a wireless local area network module and a code division multiple access module.

8. The sensor assembly of claim 1, wherein the image sensor is a complementary metal oxide semiconductor image sensor.

9. The sensor assembly of claim 1, wherein the image sensor comprises:
    a photodiode layer positioned on the substrate;
    a power line layer positioned on the photodiode layer;
    a first metal layer;
    a first dielectric layer positioned between the power line layer and the first metal layer;
    a plurality of gate electrodes each connected between the power line layer and the first metal layer;

a second metal layer,
a second dielectric layer positioned between the first and second metal layers;
a nitride layer;
a third dielectric layer positioned between the second metal layer and the nitride layer;
a plurality of color filters positioned on the nitride layer and arranged in an array;
a planarization layer positioned on the nitride layer and packaging the color filters;
a plurality of micro-lenses positioned on the planarization layer;
a plurality of epitaxial units positioned within the first dielectric layer; and
a plurality of connecting units each connecting a corresponding epitaxial unit to the power line layer.

10. The sensor assembly of claim 1, wherein the acceleration sensor comprises a packaging unit, the packaging unit is substantially cubic-shaped and has a surface, a recess is defined in the surface, a positive electrode and a negative electrode are positioned on the bottom portion of the recess, the positive electrode is coated with a first conductive glue layer, and the negative electrode is coated with a second conductive glue layer, a piezoelectric vibrating member is positioned on the first and second conductive glue layers, and a cover covers and seals the recess.

11. The sensor assembly of claim 10, wherein each of the first and second conductive glue layers is comprised of a resin material doped with conductive particles.

12. The sensor assembly of claim 11, wherein the piezoelectric vibrating member is in a shape of tuning fork and comprises a base, a first vibrating arm and a second vibrating arm, the base is positioned on the first and second conductive glue layers, and the first and second vibrating arms extend from the base and are substantially parallel to each other.

13. The sensor assembly of claim 12, wherein a second positive electrode and a second negative electrode are positioned at two opposite sides of the base, the first conductive glue layer electrically connects the second positive electrode to the first positive electrode, and the second conductive glue layer electrically connects the second negative electrode to the first negative electrode.

14. The sensor assembly of claim 13, wherein a first strip-shaped groove is longitudinally defined in each of a front surface and a back surface of the first vibrating arm, a second strip-shaped groove is longitudinally defined in each of a front surface and a back surface of the second arm, a first actuating negative electrode is positioned on an inner surface of each first strip-shaped groove, a second actuating negative electrode is positioned at two opposite sides of the second vibrating arm, a first actuating positive electrode is positioned on an inner surface of the second strip-shaped groove, a second actuating positive electrode is positioned at two opposite sides of the first vibrating arm, the second positive electrode is electrically connected to the first and second actuating positive electrodes, and the second negative electrode is electrically connected to the first and second actuating negative electrodes.

15. The sensor assembly of claim 14, wherein the piezoelectric vibrating member has a length of about 1300 micrometers, and each of the first and second vibrating arms has a length of about 1040 micrometers and a width in a range from about 40 micrometers to about 55 micrometers.

16. The sensor assembly of claim 15, wherein the second positive and negative electrodes, the first and second actuating positive electrodes, and the first and second actuating negative electrodes are made of tungsten.

17. The sensor assembly of claim 1, wherein the gyroscope sensor comprises a packaging member, the packaging member is substantially cubic-shaped and has a plane, a receiving cavity is defined in the plane, a gyroscope member is positioned on the bottom of the receiving cavity, and a cover plate covers and seals the receiving cavity.

18. The sensor assembly of claim 17, wherein the gyroscope member comprises a main body, two supporting members, two actuating cantilever beams and two detecting cantilever beams, the two supporting members are positioned at two opposite sides of the main body and extend in opposite directions from the main body, each actuating cantilever beam and a corresponding detecting cantilever beam extend in opposite directions from the supporting member.

19. The sensor assembly of claim 18, wherein a first receiving groove is longitudinally defined in each of a front surface and a back surface of the actuating cantilever beam and configured to receive an actuating electrode member, and a second receiving groove is longitudinally defined in each of a front surface and a back surface of the detecting cantilever beam and configured to receive a detecting electrode member.

20. The sensor assembly of claim 19, wherein a first mass block is positioned at the end of each actuating cantilever beam and configured to increase the sensitivity of the actuating cantilever beam, and a second mass block is positioned at the end of each detecting cantilever beam and configured to increase the sensitivity of the detecting cantilever beam.

* * * * *